United States Patent [19]

Hay, II

[11] Patent Number: 4,505,662
[45] Date of Patent: Mar. 19, 1985

[54] APPARATUS FOR THE FLEXIBILIZATION OF SYNTHETIC RESINOUS FOAM

[75] Inventor: Robert A. Hay, II, Midland, Mich.

[73] Assignee: The Dow Chemical Company, Midland, Mich.

[21] Appl. No.: 341,939

[22] Filed: Jan. 22, 1982

[51] Int. Cl.³ .............................................. B29D 27/00
[52] U.S. Cl. ..................................... 425/329; 100/144; 100/151; 264/321; 264/DIG. 4; 271/69; 271/198; 425/817 C
[58] Field of Search ............................ 425/329, 817 C; 264/321, DIG. 4; 100/144, 151; 271/69, 194, 198

[56] References Cited

U.S. PATENT DOCUMENTS

| | | | |
|---|---|---|---|
| 1,052,007 | 2/1913 | Levi | 271/198 X |
| 1,868,784 | 7/1932 | Wood | 271/198 |
| 2,268,304 | 12/1941 | Rapley | 271/198 |
| 2,391,170 | 12/1945 | Labombarde | 271/198 X |
| 2,680,140 | 6/1954 | Carter | 264/321 X |
| 2,863,663 | 12/1958 | Richards | 271/69 |
| 3,159,700 | 12/1964 | Nakamura | 264/321 |
| 3,191,224 | 6/1965 | Nakamura | 264/321 X |
| 3,200,437 | 8/1965 | Sasanko | 264/DIG. 4 |
| 3,400,196 | 9/1968 | LeRoy | 264/321 |
| 3,504,064 | 3/1970 | Bauer | 264/321 X |
| 4,106,767 | 8/1978 | Schirrmeister et al. | 271/198 X |
| 4,252,517 | 2/1981 | Milford et al. | 264/321 X |
| 4,273,034 | 6/1981 | Molitorisz | 100/144 X |

FOREIGN PATENT DOCUMENTS 24960 of 1907 United Kingdom ............... 271/198

Primary Examiner—Philip E. Anderson
Attorney, Agent, or Firm—R. B. Ingraham

[57] ABSTRACT

Rigid plastic foam is flexibilized in an apparatus utilizing four sets of foam gripping belts. A first and second set of opposed belts traveling at a given speed forward the foam into the apparatus to a second and third set of opposed belts traveling at a slower speed than the first and second set of belts. The first and third and the second and fourth sets of belts are interdigitated in a region of foam crush.

9 Claims, 6 Drawing Figures

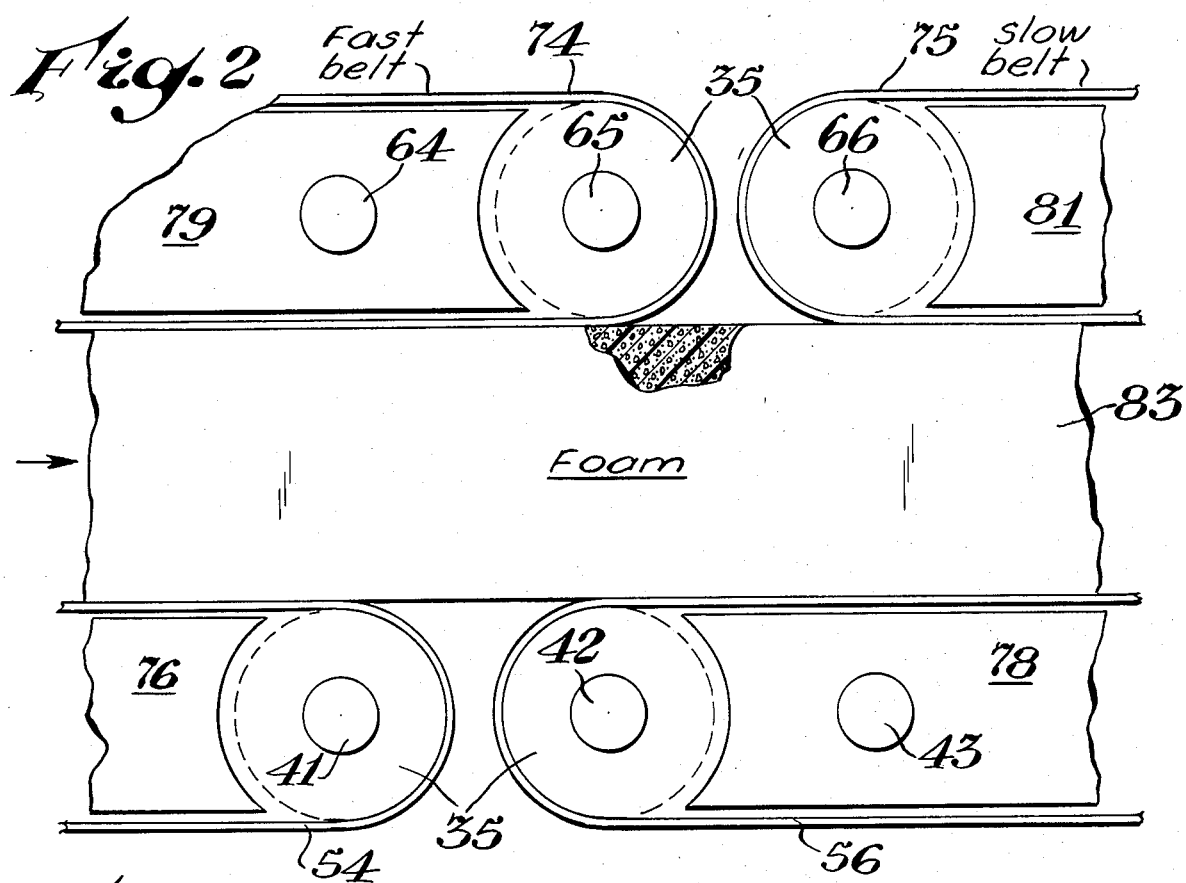
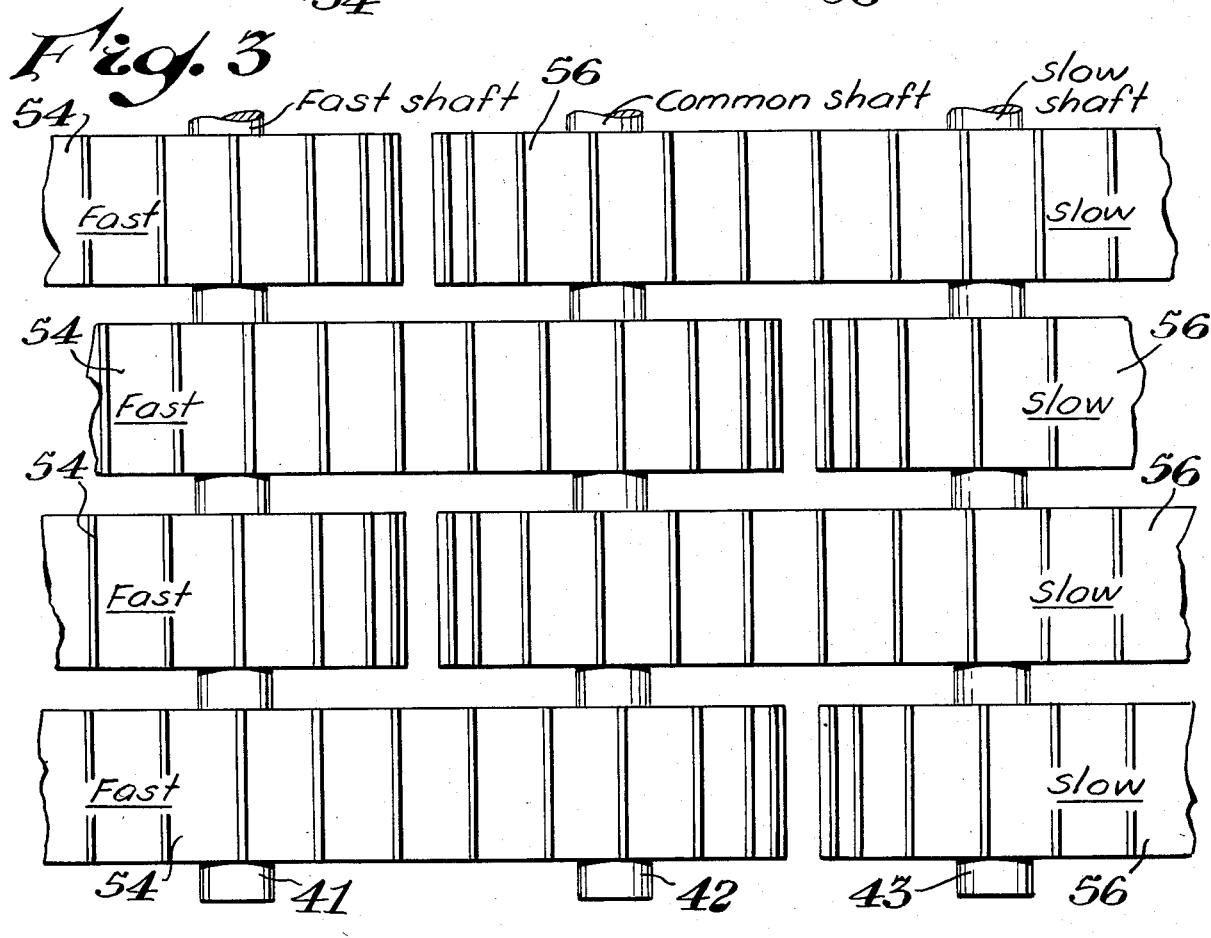

APPARATUS FOR THE FLEXIBILIZATION OF SYNTHETIC RESINOUS FOAM

Rigid plastic foams have been widely employed for thermal insulation and decorative purposes. Such rigid foams generally are prepared by an extrusion of a thermoplastic material such as polystyrene which contains a volatile fluid foaming agent; for example, methylchloride. Generally, such foams are produced in the form of boards or planks of varying thicknesses, widths and densities. For a variety of applications where foam is desired to have a curved configuration, the foam has been flexibilized. Such flexibilization is well known and used as set forth in U.S. Pat. Nos. 3,159,700 and 3,191,224.

Foam has also been flexibilized employing a four-belt system wherein a first and second pair of opposed belts grip the foam and forward it to third and fourth belts oppositely disposed and adapted to grip the foam. Adjacent portions of the first and third belts and second and fourth belts are in spaced-apart relationship. The first and second belts are moving at a surface speed somewhat faster than the surface speed of the third and fourth belts causing the foam to be compressed in a region between the first and third and second and fourth belts. Such an arrangement results in one directional flexibilization. For example, if a foam plank measuring two inches in thickness, twelve inches in width, and ten feet in length is passed through such a machine, the resultant flexibilized plank will be slightly less than ten feet in length and is readily bent in a lengthwise direction. The stiffness in the transverse direction is about the same as the original plank. Minor variations in density and cell size of the foam can result in non-uniform flexibilization. The compressive strength of a plastic foam generally is proportional to its density. If the density of the plank or foam being flexibilized by the hereinbefore set forth methods varies, significant differences in degree of flexibility of the flexibilized board or plank become very evident; and with minor variations and densities, such flexibilized plank can have a sinuous configuration which can often result in processing difficulties when the plank is being fabricated into articles of a different configuration.

It would be desirable if there were available an improved foam flexibilization apparatus which would provide generally uniform flexibilization of foam passed therethrough.

It would also be desirable if there were available an improved foam flexibilization apparatus which would provide generally uniform flexibilization of a plank and provide at least minor flexibilization thereof in a transverse direction.

These benefits and other advantages in accordance with the present invention are achieved in a plastic foam flexibilization apparatus comprising a first plurality of foam engaging belts, a second plurality of foam engaging belts; the first and second pluralities of foam engaging belts being disposed in generally parallel opposed spaced-apart relationship and adapted to engage a generally planar plastic foam work piece therebetween; a third and fourth plurality of foam engaging belts being disposed in generally parallel opposite spaced-apart relationship and adapted to engage a generally planar plastic foam work piece forwarded between first and second plurality of belts; the first and third plurality of belts being generally coplanar; the second and fourth plurality of belts being generally coplanar; the adjacent portions of the first and third plurality of belts being interdigitated and the adjacent portions of the second and fourth plurality of belts being interdigitated; a drive means to drive said belts wherein the first and second plurality of belts travel at a surface speed greater than the surface speed of the third and fourth plurality of belts.

Further features and advantages of the present invention will become more apparent from the following specification taken in connection with the drawing wherein:

FIG. 2 is a schematic fractional view of adjacent belts of the apparatus;

FIG. 3 is a schematic fractional representation of a top view of adjacent belt groups;

Figure 1:
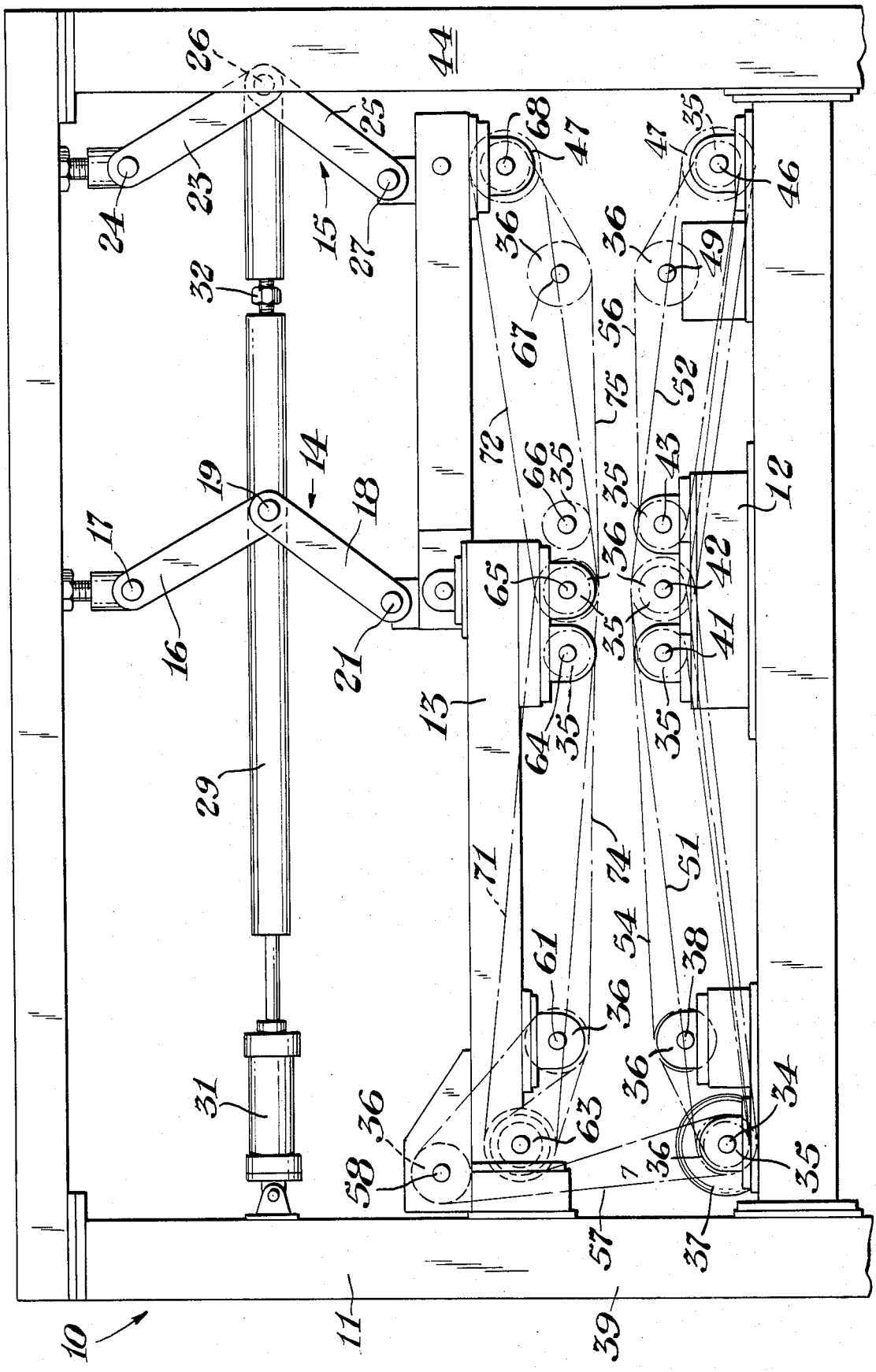
FIG. 1 is a schematic side view of an apparatus in accordance with the present invention.

In FIG. 1, there is schematically depicted a side view of an apparatus in accordance with the present invention generally designated by the reference numeral 10. The apparatus 10 comprises in cooperative combination of frame 11. The frame 11 has generally rigidly affixed thereto a first belt support means 12 and a second or movable belt support means 13. The belt support means 12 and 13 are in generally parallel spaced-apart relationship. The second or movable belt support means is affixed to the frame 11 by means of a first toggle assembly 14 and a second toggle assembly 15. Toggle assembly 14 comprises an arm 16 pivotally affixed to the frame 11 by means of pivot 17. Remote from the frame 11, arm 16 is pivotally affixed to an arm 18 by means of pivot 19. Remote from pivot 19, the arm 18 is pivotally affixed to the second belt support means 13 by a pivot 21. The toggle assembly 15 has a first arm 23 pivotally affixed to the frame 11 by means of pivot 24. Remote from pivot 24, the arm 23 is connected to second arm 25 by means of a pivot 26. Remote from pivot 26, the arm 25 is pivotally affixed to the second belt support means by means of a pivot 27. A horizontally movable shaft 29 is affixed to pivots 19 and 26. The shaft 29 is connected to a generally coaxially disposed linear actuator or hydraulic cylinder 31. The shaft 29 has disposed between shafts 19 and 26 a length adjusting means 32 which beneficially is a stud having right and left hand threads and a region adapted to be grasped by a wrench. The first belt support means has disposed thereon a first or drive shaft 34, and rigidly affixed thereto a first belt support gear 35 and a driving gear 36. The shaft 34 is connected to a drive means or motor 37. In the following description, gears of equal diameter bear the same reference numeral. Generally adjacent the shaft 34 is disposed a parallel shaft 38 having affixed thereto a gear 36. The shaft 34 is disposed generally adjacent an entrance end 39 of the frame 11. A shaft 41, parallel to shafts 34 and 38 is disposed generally centrally within the frame 11 and has affixed thereto a gear 35. Adjacent the shaft 41 there is an idler shaft 42 parallel to shaft 41 and having disposed thereon a plurality of gears 35 and two gears 36. Generally adjacent shaft 42 and spaced therefrom is a shaft 43 having disposed thereon a plurality of gears 35. Adjacent a second or exit end 44 of the frame 11 is disposed a shaft 46. The shaft 46 has affixed thereto a plurality of gears 35 and a gear 47. The gear 47 is slightly larger in diameter than the gears 36. Between the shafts 43 and 46 is disposed a shaft 49 having affixed thereto a plurality of gears 36. A driving belt 51 passes over a gear 36 on shaft 34 to a gear 36 on shaft 42. A second driving belt 52 passes over a gear 36 on shaft 42 and about gear 47 of shaft 46. Thus as the gear 36 on shaft 34 rotates, the gears 35 on shafts 34 and 42 rotate with equal angular velocity. Power transmitted by the belt 52 from a gear 36 on shaft 42 causes the gear 47 on shaft 46 and the associated gears 35 on shaft 46 to rotate at a speed somewhat less than the speed of rotation of the gears 35 on shafts 34 and 42. A plurality of foam engaging belts designated by the reference numeral 54 pass over gears 35 on shaft 34. The belts 54 variously pass over gears 35 on shafts 41 or 42. Each of the belts 54 passes over an idler gear 36 disposed on shaft 38. A plurality of foam engaging belts 56 pass over gears 35 on shaft 46 and are driven thereby. The belts 56 pass over the gear 36 on shaft 49 and pass over one of the gears 35 disposed on shaft 42 or 43. The arrangement of the belts is more clearly set forth in FIGS. 2 and 3. A power transmission belt 57 passes about a gear 36 on shaft 34 over a gear 36 mounted on shaft 58, shaft 58 being supported on the movable belt support 13. The belt 57 passes over a gear 36 mounted on shaft 61. The shaft 61 is movably supported on the movable belt support 13. The belt 57 then passes over a gear 36 supported on shaft 63. The shaft 63 is generally parallel to shaft 34 and is in spaced-apart relationship therefrom. The gear 36 on shaft 61 serves to maintain desired belt tension as the movable support 13 is moving toward or away from belt support 12. Generally centrally disposed on the belt support 13 is shaft 64 which is parallel and opposite shaft 41 of the belt support 12. A plurality of gears 35 are disposed on shaft 64. Generally adjacent shaft 64, remote from shaft 61 and opposite shaft 42, is shaft 65 having disposed thereon a plurality of gears 35 and at least two gears 26. A shaft 66 is disposed adjacent and parallel to shaft 65 and opposite shaft 43. The shaft 66 carries thereon a plurality of gears 35. A shaft 67 is disposed generally adjacent the exit end 44 of the frame 11. Shaft 67 is parallel to shaft 66 and shaft 49. The shaft 67 is generally oppositely disposed to shaft 49 and carries thereon a plurality of gears 36. A shaft 68 is affixed to the belt support 13 and is disposed generally adjacent to the exit end 44 of the frame 11. The shaft 68 is opposite and parallel to shaft 46 and parallel with shaft 66 and 67. The shaft 68 has a plurality of gears 35 disposed thereon and a gear 47. A drive belt 71 passes over a gear 36 on shaft 63 and about gear 36 on shaft 65. A second gear 36 on shaft 65 engages a drive belt 72 which passes about gear 47 on shaft 68. A plurality of foam engaging belts 74 pass over gears 35 disposed on shaft 63 and over gears 35 disposed on shafts 64 or 65. A generally similar plurality of foam engaging belts 75 passes over gears 35 disposed on shaft 68 and over gears 35 disposed on shaft 65 or 66. The foam engaging belts 54 are each supported with guide plate arrangements 76. Each of the plurality of foam engaging belts 56 is supported by a guide plate 78. Each of the foam engaging belts 74 have associated therewith a guide plate 79. The foam engaging belts 75 each have associated therewith a supporting guide plate 81.

In FIG. 2 there is schematically depicted a fractional sectional side view of adjacent belts in engagement with a foam body being flexibilized. A foam work piece is designated by the reference numeral 83. FIG. 2 depicts the manner in which foam engaging belts are offset or interdigitated in the region of the shafts 41, 42 and 43; and 64, 65 and 66.

FIG. 3 is a fractional schematic representation of the arrangement of foam engaging belts in the region of shafts 41, 42 and 43 which is generally similar to the arrangement of shafts 64, 65 and 66. Thus the belts of adjacent plurality on the fixed belt support are in interdigitated relationship. The belts 74 and 75 are similarly arranged.

Figure 4:
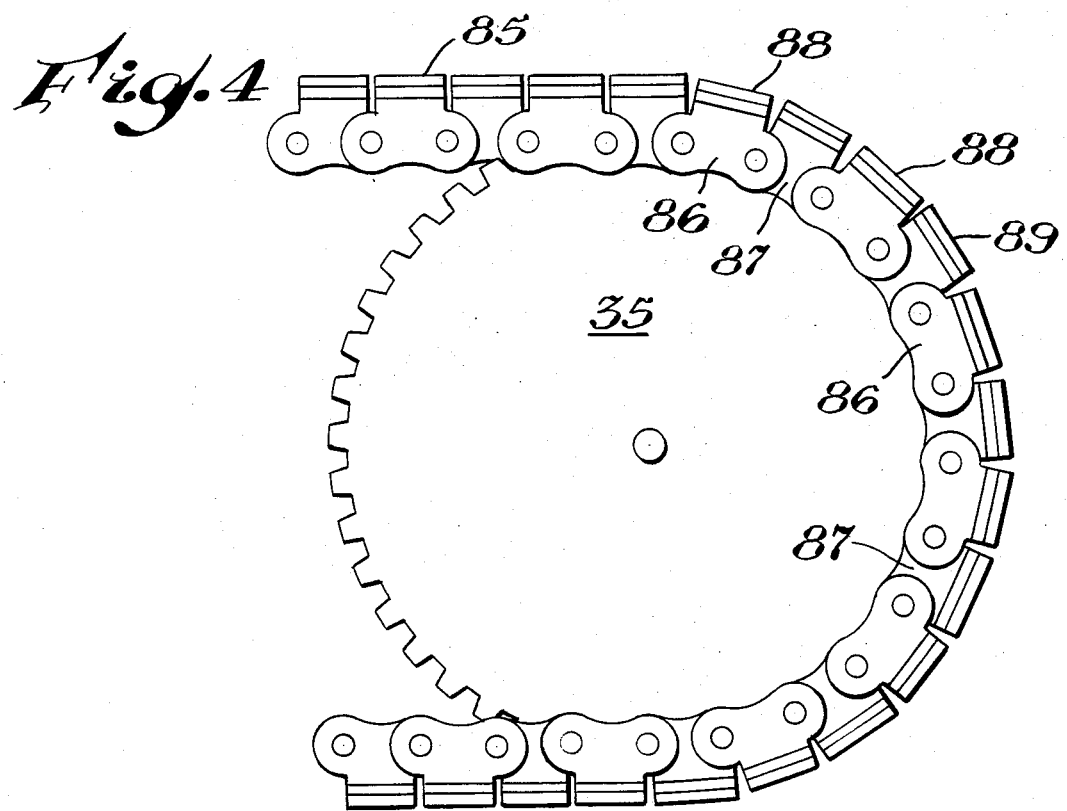
FIG. 4 is a schematic side view of a belt useful in the apparatus of the invention.

In FIG. 4 there is depicted a gear 35 having a linked foam engaging belt 85. Belt 85 is of the roller chain variety and comprises a plurality of links 86 joined by links 87. The links 86 and 87 terminate in foam engaging pads 88 and 89, respectively.

Figure 5:
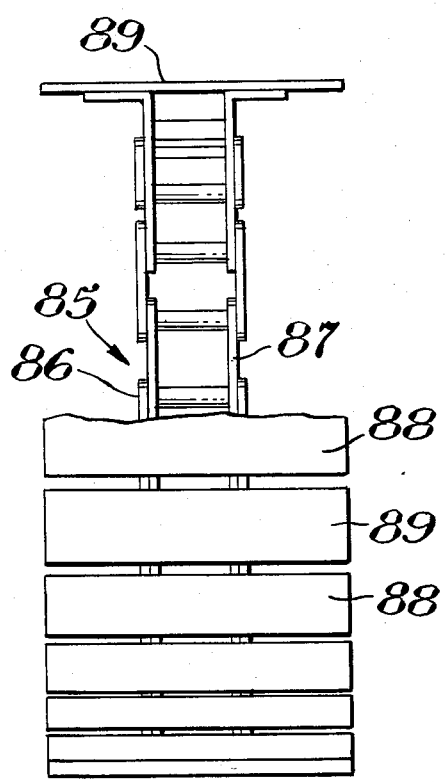
FIGS. 5 and 6 are views of a belt useful in the apparatus of the present invention.

FIG. 5 shows a portion of a chain 85 having links 86 and 87 and pads 88 and 89. Pads 88 and 89 are rectangular, planar and generally of equal size.

Figure 6:
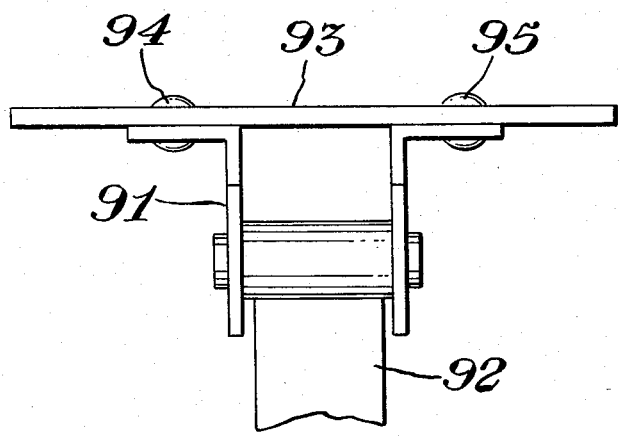

FIG. 6 depicts an end view of a severed chain such as the chain 91 in contact with a backing plate 92, the backing plate 92 being generally equivalent to the backing plates 75, 78, 79 and 81 of FIG. 1. The chain 91 has a plurality of pads 93 affixed to the links by means of rivets 94 and 95.

In operation of the apparatus in accordance with the present invention, on rotation of the shaft 34, the gears 36 on shafts 34 and 63 are rotated at equal speeds as are the gears 35 on the shafts 34 and 63. Thus the plurality of belts 54 and 74 will move at equal speed and as rotation is made as indicated by the arrow in FIG. 1, the adjacent surface of the plurality of belts will move from the entrance end 39 toward the exit end 44. Rotation of the gear 36 on shaft 34 also causes rotation of the gears 36 on shafts 42 and 65 by means of drive belts 51 and 71, respectively. Movement of the drive belts 51 and 71 also causes movement of the belts 52 and 72. As the belts 52 and 72 move, they cause rotation of the gears 47 disposed on shafts 46 and 68, respectively. As the gears 47 are larger in diameter than the gears 36, rotation of the gears 35 on shafts 46 and 68 will be at a somewhat slower rate than rotation of the gears 35 on shafts 41 and 64. The adjacent surfaces of the plurality of belts 56 and the plurality of belts 75 will move from the direction of the entrance end 39 toward the exit end 44.

In flexibilizing a foam plank, the foam is positioned between the plurality of belts 54 and the plurality of belts 74 and the movable frame positioned to provide the desired degree of engagement of the foam with the belts 54 and 74. On rotation of the gears on shaft 34, the foam will be drawn into the machine and crushed generally longitudinally and somewhat laterally in the region of shafts 41, 42 and 43 and 64, 65 and 66. The flexibilized foam is then discharged at the discharge end 44. For thermoplastic foam, generally the difference in surface speed for the belts is about 10 percent to provide satisfactory flexibilization for most purposes. Due to the staggered arrangement of the belts as depicted in FIG. 3, the foam is selectively crushed in a highly localized manner and the resultant flexibilized foam does not exhibit the non-uniformities that are evident employing a four-belt flexibilizer. In general, flexibilizing is accomplished by compressing the foam to a degree sufficient to bend or wrinkle the cell walls of the foam structure depending on the particular foam and the characteristics of the particular foam. In some cases cell wall rupture will be obtained with relatively little pressure while other foams can receive significantly more deformation without rupture.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A plastic foam flexibilization apparatus comprising a first plurality of foam engaging belts, a second plurality of foam engaging belts; the first and second pluralities of foam engaging belts being disposed in generally parallel opposed spaced-apart relationship and adapted to engage a generally planar plastic foam work piece therebetween; a third and fourth plurality of foam engaging belts being disposed in generally parallel opposite spaced-apart relationship and adapted to engage a generally planar plastic foam work piece forwarded between first and second plurality of belts; the first and third plurality of belts being generally coplanar; the second and fourth plurality of belts being generally coplaner; the adjacent portions of the first and third plurality of belts being interdigitated and the adjacent portions of the second and fourth plurality of belts being interdigitated; a drive means to drive said belts wherein the first and second plurality of belts travel at a surface speed greater than the surface speed of the third and fourth plurality of belts.

2. The apparatus of claim 1 wherein said belts comprise a plurality of links.

3. The apparatus of claim 1 wherein said first and third plurality of belts are affixed to a fixed belt support means.

4. The apparatus of claim 3 wherein the second and fourth plurality of belts is affixed to a movable belt support means adapted to vary space between the first and third plurality of belts and the second and fourth plurality of belts.

5. The apparatus of claim 4 wherein the movable belt support means is supported by toggle linkages.

6. The apparatus of claim 5 wherein the toggle linkages have attached thereto a movable shaft to activate said linkages.

7. The apparatus of claim 1 wherein said drive means comprises a plurality of gears in operative association with at least two driving belts.

8. The apparatus of claim 1 wherein at least a portion of the foam engaging belts has in association therewith a guide plate adapted to maintain at least a portion of the belt in contact with foam disposed between adjacent pluralities of belts.

9. The apparatus of claim 8 wherein each of the foam engaging belts has an associated guide plate.

* * * * *